(12) United States Patent
Zhang et al.

(10) Patent No.: US 10,365,742 B2
(45) Date of Patent: Jul. 30, 2019

(54) TOUCH PANEL DISPLAY

(71) Applicant: Shanghai Tianma Micro-Electronics Co., Ltd., Shanghai (CN)

(72) Inventors: Min Zhang, Shanghai (CN); Hao Guo, Shanghai (CN); Kaihong Huang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 38 days.

(21) Appl. No.: 15/701,927

(22) Filed: Sep. 12, 2017

(65) Prior Publication Data

US 2018/0341353 A1    Nov. 29, 2018

(30) Foreign Application Priority Data

May 25, 2017    (CN) .......................... 2017 1 0377976

(51) Int. Cl.
*G06F 3/044* (2006.01)
*G06F 3/041* (2006.01)
*G02F 1/1333* (2006.01)
*G02F 1/1343* (2006.01)

(52) U.S. Cl.
CPC .......... *G06F 3/0412* (2013.01); *G02F 1/1343* (2013.01); *G02F 1/13338* (2013.01); *G02F 1/133345* (2013.01); *G06F 3/044* (2013.01); *G06F 3/0416* (2013.01)

(58) Field of Classification Search
CPC ........... G02F 1/133345; G02F 1/13338; G02F 1/1343; G06F 3/0412; G06F 3/0416; G06F 3/044

USPC .................................................. 345/170–176
See application file for complete search history.

(56) References Cited

U.S. PATENT DOCUMENTS

| 2015/0378390 A1* | 12/2015 | Liu .................. G06F 3/0412 345/173 |
| 2016/0202813 A1* | 7/2016 | Lee .................. G06F 3/044 345/174 |
| 2016/0306459 A1* | 10/2016 | Yang .................. G06F 3/044 |
| 2017/0003786 A1* | 1/2017 | Kim .................. G02F 1/136286 |

(Continued)

FOREIGN PATENT DOCUMENTS

CN    105583544 A    5/2016

*Primary Examiner* — Tony O Davis
(74) *Attorney, Agent, or Firm* — Tarolli, Sundheim, Covell & Tummino LLP

(57) ABSTRACT

A touch display panel, including a first substrate; a plurality of pixel units on first substrate and arranged in array; a touch electrode layer on first substrate, including a plurality of touch electrodes arranged in array and insulated from each other, a touch signal line layer, including a plurality of touch signal lines; a control circuit for providing touch signal to touch electrode, each touch signal line electrically connecting one touch electrode with control circuit, and each touch electrode electrically connected with at least one touch signal line; an insulation layer between touch electrode layer and touch signal line layer, including a plurality of through holes, touch electrodes electrically connected with touch signal lines via through holes; wherein distribution density of through hole is not more than 0.1 and defined as: ratio of the number of through hole to the number of pixel unit covered by one touch electrode.

10 Claims, 3 Drawing Sheets

(56) References Cited

U.S. PATENT DOCUMENTS

| | | | |
|---|---|---|---|
| 2017/0040251 A1* | 2/2017 | Feng | G02F 1/136227 |
| 2017/0090636 A1* | 3/2017 | Ding | G06F 3/0412 |
| 2017/0300153 A1* | 10/2017 | Li | G06F 3/044 |
| 2018/0032191 A1* | 2/2018 | Xiao | G06F 3/0412 |
| 2018/0341353 A1* | 11/2018 | Zhang | G06F 3/0412 |

* cited by examiner

TOUCH PANEL DISPLAY

CROSS-REFERENCE TO RELATED APPLICATIONS

The present application claims priority to Chinese Patent Application No. 201710377976.4, filed on May 25, 2017, the content of which is incorporated herein by reference in its entirety.

TECHNICAL FIELD

The present disclosure relates to the field of display technologies and, particularly, relates to a touch display panel.

BACKGROUND

As an input medium, the touch screen is currently a most simple, convenient and natural way of man-machine interaction. It has been a research focus to integrate touch function into a display device for more and more flat-panel displayer manufacturers.

At present, capacitive touch is a widely adopted touch technique. In order to reduce thickness of a display panel and achieve touch function, usually a touch structure is integrated into the display panel. A plurality of touch electrodes is formed at the display area, a common electrode for displaying a pixel can also be used as a touch electrode and be driven by time division. During a display stage, the common electrode receives a common signal, and during a touch stage, the common electrode receives a touch signal. In the prior art, the signal of the common electrode used as the touch electrode is transmitted via a metal line arranged in a different layer. An insulation layer is provided between the metal line and the electrode, and an electrical connection is achieved by punching a hole, since the punching position is limited by the shape and arrangement of electrode, the through hole is usually distributed non-uniformly, resulting in that the through hole is visible, thereby forming a display mura, which influences display effect of the touch display panel. In the prior art, in order to solve such a problem, a dummy signal line is provided so as to provide a dummy through hole thereon, then by adjusting distribution of the through hole, so that an uniform distribution of the through hole can be achieved to solve the problem of display mura. However, the dummy signal line is not adaptive to all built-in touch structures, for example, a structure in which the touch signal line and a specific metal layer are arranged in a same layer, there is no enough space for arranging the dummy signal line, so that the problem of display mura caused by non-uniform distribution of the through hole cannot be solved.

SUMMARY

In view of the above, the present disclosure provides a touch display panel adaptive to any touch display panel, thereby solving the problem of display mura caused by non-uniform distribution of the through hole.

The present disclosure provides a touch display panel, including: a first substrate; a plurality of pixel units provided on the first substrate and arranged in an array; a touch electrode layer provided on the first substrate, the touch electrode layer including a plurality of touch electrodes, the plurality of touch electrodes arranged in an array and insulated from each other, a touch signal line layer including a plurality of touch signal lines; a control circuit configured to provide a touch signal to the plurality of touch electrodes, wherein each of the plurality of touch signal lines electrically connects one of the plurality of touch electrodes with the control circuit, and each of the plurality of touch electrodes is electrically connected with at least one of the plurality of touch signal lines; and an insulation layer provided between the touch electrode layer and the touch signal line layer, the insulation layer including a plurality of through holes, the plurality of touch electrodes electrically connected with the plurality of touch signal lines via the plurality of through holes; wherein a distribution density of the plurality of through holes is less than or equal to 0.1, and the distribution density of the plurality of through holes is defined as: a ratio of the number of the plurality of through holes covered by one of the plurality of touch electrodes to the number of the plurality of pixel units covered by one of the plurality of touch electrodes.

In the present disclosure, by designing relation between the number of through hole covered by one touch electrode and the number of pixel unit covered by one touch electrode, an excellent display effect can be achieved, which avoids display mura caused by visible through holes, distribution of the through hole is no longer limited to the uniform distribution in the prior art, thereby greatly simplifying processing and design requirements on the touch display panel.

DESCRIPTION OF EMBODIMENTS

Figure 1A:
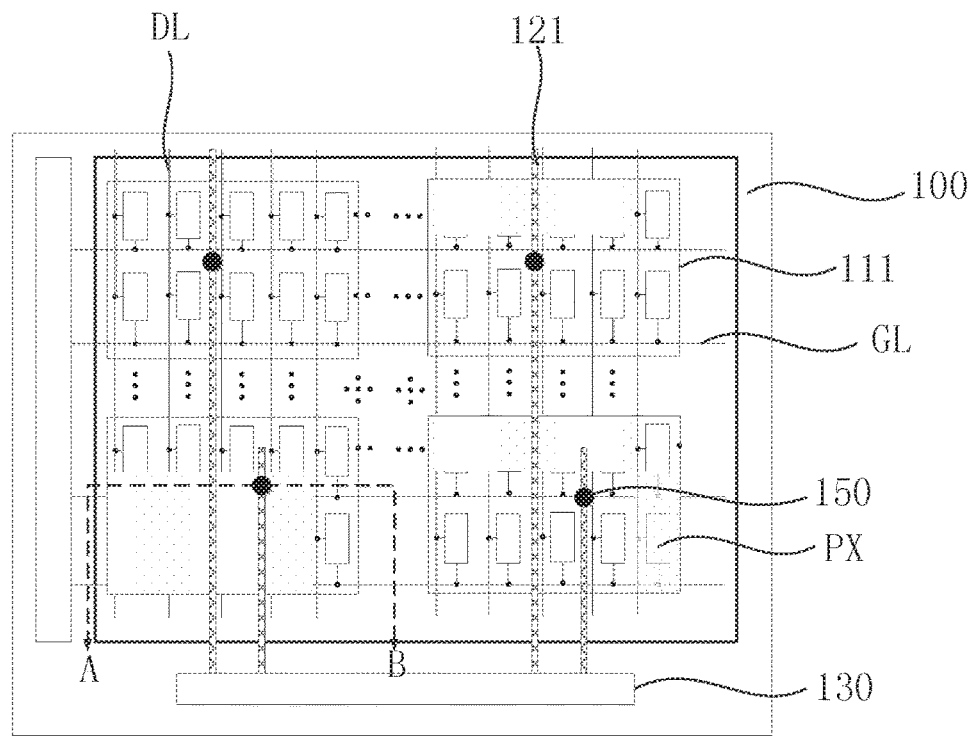
FIG. 1a illustrates a schematic diagram of a touch display panel according to an embodiment of the present disclosure.

Since the described techniques relate to various changes and embodiments, the embodiments will be shown in the accompanying drawings and described in detail in the written description. The effects and features of the described techniques will be further described with reference to the accompanying drawings. It should be noted that, merely exemplary embodiments are shown in the drawings. However, the described techniques may be implemented in multiple different manners and should not be limited to the embodiments as described herein.

The same or corresponding components are denoted by the same reference sign with no relation to the number of figure. In the specification, expressions "first" and "second" are used to describe various components, these expressions are merely for distinguishing one from another, which will not limit the components.

In the specification, expressions "comprise", "include" are used to illustrate the presence of the features and/or components in the specification, which will not exclude the presence of one or more other features and/or one or more other components. It should be understood that, when a layer, an area, a component or the like is referred to as being "on" another layer, another area or another component, it is possible that the layer, the area, the component or the like is directly on the other layer, the other area or the other component, or it is also possible that there exists a middle layer, a middle area, or a middle component.

In the accompanying drawings, the thickness of the region and layer may be enlarged for clarity. For example, for ease of description, the thickness and size of the element in the accompanying drawings are not shown in proportion, and thus, the technical scope is not limited to the accompanying drawings.

In the following specification, in one or more exemplary embodiments, X-axis, Y-axis, and Z-axis may not be limited to three axes with respect to a rectangular coordinate system, but may be interpreted as a broad concept including the three axes. For example, the X-axis, the Y-axis, and the Z-axis may be perpendicular to each other or may represent different directions that are not perpendicular to each other.

In addition, it should be noted that, in some alternative implements, the steps of all methods described herein may not be performed in sequence. For example, two successive steps may be substantially performed at the same time in practice, or the two steps may be performed in a reverse sequence.

The expression "and/or" as used herein includes any and all combinations of one or more associated items as listed. When the expression "at least one of" appears before a list of elements, the expression is used for indicating the whole list of elements rather than indicating only a single element. In the present disclosure, the expression "substantially" indicates the meaning of "completely", "almost" or "obviously" under some scenarios or according to those skilled in the art. In addition, the expression " . . . is formed/arranged/placed on . . . " also means" . . . is formed/arranged/placed at . . . ". The expression "connection" includes electrical connection.

The present disclosure will be further illustrated with reference to the accompanying drawings and embodiments.

Figure 1B:
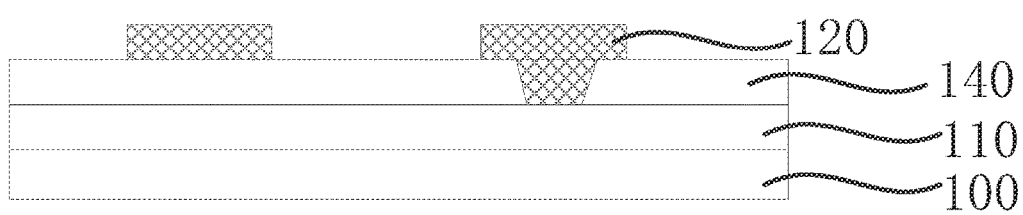
FIG. 1b illustrates a cross-sectional view along line AB in FIG. 1.

FIG. 1a illustrates a structural schematic diagram of a touch display panel according to an embodiment of the present disclosure, FIG. 1b illustrates a cross-sectional diagram along line AB in FIG. 1, with reference to FIGS. 1a and 1b, the touch display panel includes a first substrate 100, a plurality of pixel units PX provided on the first substrate 100 and arranged in an array, a touch electrode layer 110 provided on the first substrate 100, the touch electrode layer 110 including a plurality of touch electrodes 111 arranged in an array and insulated from each other;

a touch signal line layer 120 including a plurality of touch signal lines 121;

a control circuit 130 configured to provide a touch signal to the plurality of touch electrodes 111.

each touch signal line 121 electrically connects one touch electrode 111 with the control circuit 130, and each touch electrode 111 is electrically connected with at least one touch signal line 121;

an insulation layer 140 is provided between the touch electrode layer 110 and the touch signal line layer 120, and the insulation layer 140 includes a plurality of through holes 150, the plurality of touch electrode 111 is electrically connected with the plurality of touch signal lines 121 via the plurality of through holes 150;

a distribution density of the through holes 150 is less than or equal to 0.1, the distribution density of the through holes 150 is defined as: a ratio of the number of through hole 150 covered by one touch electrode 111 to the number of pixel unit PX covered by one touch electrode 111.

The touch display panel provided by the embodiments of the present disclosure can be a liquid crystal display panel, the liquid crystal display panel generally includes an array substrate, a color film substrate and a liquid crystal layer located between the array substrate and the color film substrate. The array substrate includes a base substrate, which is generally made of glass. As shown in FIG. 1a, generally a plurality of gate lines GL and a plurality of data lines DL are provided on the first substrate 100, the plurality of gate lines GL intersects with the plurality of data lines DL so as to define a pixel area, and the pixel unit PX is located in the pixel area. It should be noted that, the pixel unit herein refers to a minimum light-emitting unit of the liquid crystal display panel, each pixel unit generally includes a thin-film transistor, a pixel electrode and a common electrode. The drain electrode of the thin-film transistor is electrically connected with the pixel electrode, the source electrode of the thin-film transistor is electrically connected with the data line DL, the gate electrode of the thin-film transistor is electrically connected with the gate line GL, and the other end of the gate line GL is connected with a gate electrode drive circuit. When displaying a frame, the gate electrode drive circuit can transmit a drive scan signal, so as to control the conducting and cut-off of the thin-film transistor by a gate line, when the thin-film transistor is conducted, a display signal is input to the display pixel via the data line DL and received by the pixel electrode, meanwhile, the common electrode receives a common signal, an electric field is formed between the pixel electrode and the common electrode, so as to control the display panel to display the frame.

Each pixel unit includes its own individual pixel electrode, the pixel electrodes of different pixel units are insulated from each other, and the plurality of pixel units usually share a same layer of common electrode, i.e., it is possible that the common electrode can be a whole surface of electrode.

In order to achieve touch function of the liquid crystal display panel, the touch electrode layer 110 is provided on the first substrate 100, the touch electrode layer 110 includes the plurality of touch electrodes 111 which can be arranged in an array, in the present embodiment, the touch function can be achieved by a mutual-capacitance touch, or the touch function can also be achieved by a self-capacitance touch. As for the mutual-capacitance touch, it includes a touch drive electrode and a touch detection electrode, a touch drive signal is sequentially input into the touch drive electrode, and the touch detection electrode outputs a detection signal, the touch drive electrode and the touch detection electrode form a capacitance. When a touch occurs on the touch display panel, a coupling between the touch drive electrode and the touch detection electrode close to the touch point will be influenced, thereby changing capacitance between the touch drive electrode and the touch detection electrode. A method for detecting the position of the touch point includes: sequentially inputting a touch drive signal into the touch drive electrode, meanwhile the touch detection electrode outputting a detection signal, so that capacitance value of each intersection point between the touch drive electrode and the touch detection electrode can be obtained, i.e., capacitance value of the two-dimensional plane of the entire integrated touch display panel can be obtained. According to the two-dimensional capacitance variation data of the touch display panel, a coordinate of the touch point can be calculated.

As for the self-capacitive touch, a touch drive signal is input to the touch electrode, a capacitance is formed between the touch electrode and a ground signal, when a touch occurs on the touch display panel, self-capacitance between the touch electrode and the ground signal close to the touch point will change, meanwhile the touch electrode outputs a touch detection signal, so that a position of the touch electrode where the capacitance value changes can be obtained, and thus the touch position can be determined.

In order to achieve built-in integrated touch display mode, the common electrode for display purpose can also be used as the touch electrode according to time division driven, the whole surface of common electrode is divided to be a desired touch electrode shape, i.e., the touch electrode can be used as the common electrode during the display stage, at this time, the common electrode provides a common signal to the pixel unit for display purpose, and during the touch stage, the common electrode is used as the touch electrode, so that an integration of touch and display can be achieved, thereby reducing thickness of the display panel.

In the present embodiment, it is possible that the plurality of touch electrodes is touch drive electrodes or detection electrodes, or it is also possible that the plurality of touch electrodes is self-capacitance touch electrodes. The plurality of touch electrodes can be arranged in an array as shown in FIG. 1a, in which the plurality of touch electrodes 111 is insulated from each other.

The touch signal line layer 120 generally includes the plurality of touch signal lines 121, each touch signal line 121 electrically connects one touch electrode 111 with the control circuit 130, the control circuit 130 is configured to provide a touch signal to the touch electrode and receive a touch detection signal from the touch electrode, each touch electrode 111 is electrically connected with at least one touch signal lines 121. The plurality of touch electrodes 111 can be formed as a block shape, the block-shaped touch electrodes can be arranged in a plurality of rows and columns, which can be an electrode arrangement manner for self-capacitance touch. In this manner, an orthogonal projection of one touch signal line 121 on the touch electrode layer 110 is overlapped with multiple touch electrodes 111, so as to avoid signal interference between different touch electrodes 111 caused by the arrangement of the touch signal line 121 between adjacent touch electrodes.

The insulation layer 140 is provided between the touch electrode layer 110 and the touch signal line layer 120, the insulation layer 140 includes a plurality of through holes 150, the touch electrode 111 is electrically connected with the touch signal line 121 via the through hole 150. It should be understood that, since a control circuit is usually provided at a non-display area of the display panel, each touch signal line 121 passes through multiple touch electrodes 111 and electrically connects the corresponding touch electrode with the control circuit, the insulation layer is mainly used to make touch electrodes which are not electrically connected with the touch signal line to be insulated from this touch signal line, thereby achieving that each touch electrode is electrically insulated from each one another.

In the prior art, in order to achieve an electrical connection between a specific touch signal line and a specific touch electrode, however, since the distribution of the through hole is non-uniform, resulting in that the through hole is visible, thereby forming a mura of the display panel. In order to achieve a uniform distribution of the through hole, usually a dummy touch wiring will be provided at an area having no through holes, thereby forming a dummy through hole for reducing the phenomenon of display mura. It can be understood that, the additional dummy touch wiring and dummy through hole must occupy space, which brings a high requirement on the structure of the touch display panel, the touch display panel shall provide certain space for the dummy touch wiring and the dummy through hole, which will limit optimization of the structure of the touch display panel.

In the embodiments of the present disclosure, distribution density of the through hole is less than or equal to 0.1. The distribution density of the through hole is defined as: a ratio of the number of through hole covered by one touch electrode to the number of pixel unit covered by one touch electrode. With reference to FIG. 1a, the number of pixel unit covered by one touch electrode is 10, and the number of through hole 150 covered by one touch electrode is 1, so the distribution density of the through hole is 1/10=0.1, which meets the requirement on invisibility of the through hole.

It should be noted that, in the prior art, in order to solve the problem that the through hole display is visible, a common way is to make the distribution of the through hole to be uniform, moreover, additional dummy through hole is provided to achieve the distribution uniformity of through hole. Since the pixel unit is a minimum light-emitting unit for display, each pixel unit has a certain light-emitting color, usually different colors are formed by mixture of pixel units of three primary colors of red, green and blue. In one aspect, whether the through hole is visible depends on whether the distribution of the through hole is uniform or not, when an area has a larger distribution density of the through holes, optical properties of this area will be interfered by the through hole, light emitted to the through hole will be emitted from the display panel after reflection or transmission, when the through hole at each position of the display panel has a same interference on the emitted light, the existence of through holes will not be distinguished by human eyes, which is also the principle of a common way in which the display mura is adjusted by distribution of the through hole. Based on researches, it is found that, the visibility of through hole is not only relevant to the distribution uniformity of through hole, but is also relevant to a relation between the number of through hole and the number of pixel unit, when the number of pixel unit in one area forms a specific proportional relation with the number of through hole, the influence of the through hole on the light emitted by the pixel unit in this area can be weakened, which is in weak correlation with the distribution of the through hole. Within a range of one touch electrode, when the ratio of the number of through hole covered by the touch electrode to the number of pixel unit covered by the touch electrode is greater than 0.1, human eyes can clearly perceive a brightness difference between the through hole position and other positions, resulting in an abnormal display. By adjusting the ratio of the number of through hole covered by the touch electrode to the number of pixel unit covered by the touch electrode to be less than or equal to 0.1, the brightness difference is difficult to be perceived by human eyes, which meets the effect requirement of the display panel on uniform display.

The technical solutions provided by the embodiments of the present disclosure have the following advantages as compared with the prior art: in the prior art, when adjusting the distribution of the through hole, whether the additional dummy through hole is provided or not, adjustment of the through hole position will be limited by the touch electrode and the touch electrode wiring, which makes it difficult to be implemented freely. As for technical solutions which require the additional through hole, since the additional dummy through hole needs to occupy certain space, and a dummy touch date line needs to be provided so as to achieve consistency of the optical performance of the additional dummy through hole and other through holes, and the dummy through hole is provided on the dummy signal line, which brings a higher requirement on space. However, in the technical solutions provided by the embodiments of the present disclosure, by merely adjusting the relation between the number of through hole and the number of pixel unit on one touch electrode, the requirement of the display panel on invisibility of through hole can be met. It is understood that, the limitation to the structure spatial distribution of each part of the touch display panel is greatly reduced.

Figure 2:
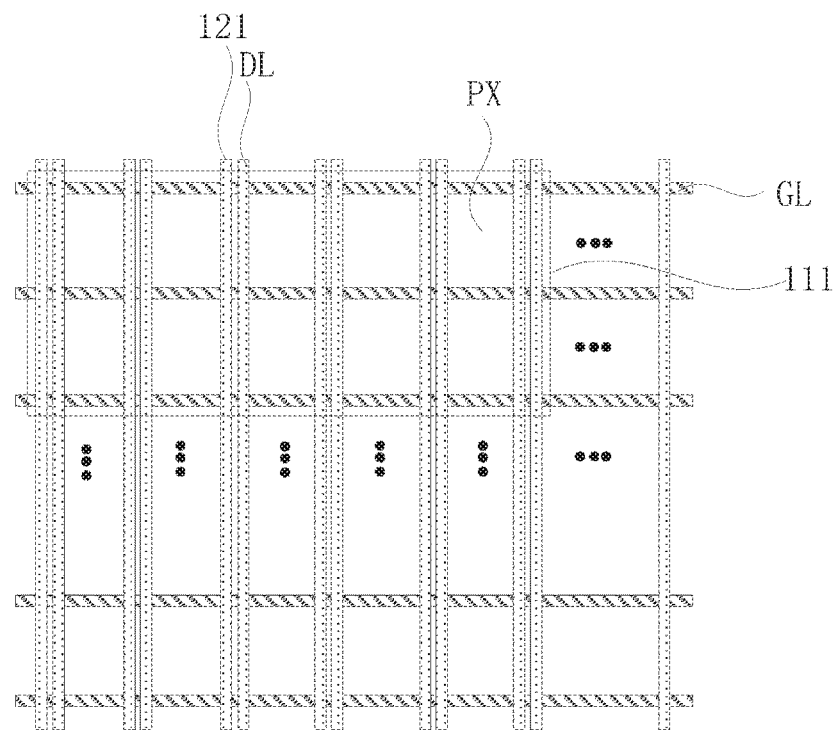
FIG. 2 illustrates a schematic diagram of another touch display panel according to an embodiment of the present disclosure.

Optionally, FIG. 2 illustrates a schematic diagram of another touch display panel according to an embodiment of the present disclosure, the touch signal line 121 and the data line DL may be arranged in a same layer. It should be understood that, the touch signal line and the data line are provided at the same layer, which does not need additional evaporation of the touch signal line layer, moreover, an additional insulation layer 140 is not necessary. Instead, such a structure can be achieved by merely using the original insulation layer of the touch display panel, which saves two processing procedures.

As for such a structure that the touch signal line and the data line are provided at the same layer, while facing the problem of reducing the display mura caused by the through hole, it is difficult to solve the problem by providing the dummy touch signal line and the additional through hole, the touch signal line is arranged in the layer where the data line is located, the data line is provided between each two columns of pixel, the number of touch signal line cannot met the requirement, and there is also no extra space for arranging the dummy touch signal line and the dummy through hole. Therefore, in the present embodiment, it is only needed to define the ratio of the number of through hole to the number of pixel unit to be less than or equal to 0.1, so that the problem of display mura can be solved. Compared with the prior art, the present solution is not limited to any technique based on this structure.

Optionally, with reference to FIG. 2, an extending direction of the touch signal line 121 is identical an extending direction of the data line DL, and the touch signal line 121 is located within interval area among the pixel units PX. In order to reduce mutual interference between the touch signal line and the data line in distribution, the touch signal line can extend along the extending direction of the data line and be arranged in the interval area between adjacent pixel units. A touch signal line 121 is provided between adjacent two columns of pixel unit PX, which, on one hand, reduces influence on the pixel unit display and, on the other hand, reduces the risk of short circuit between the touch signal line and the data line, thereby reducing the processing difficulty.

Figure 3:
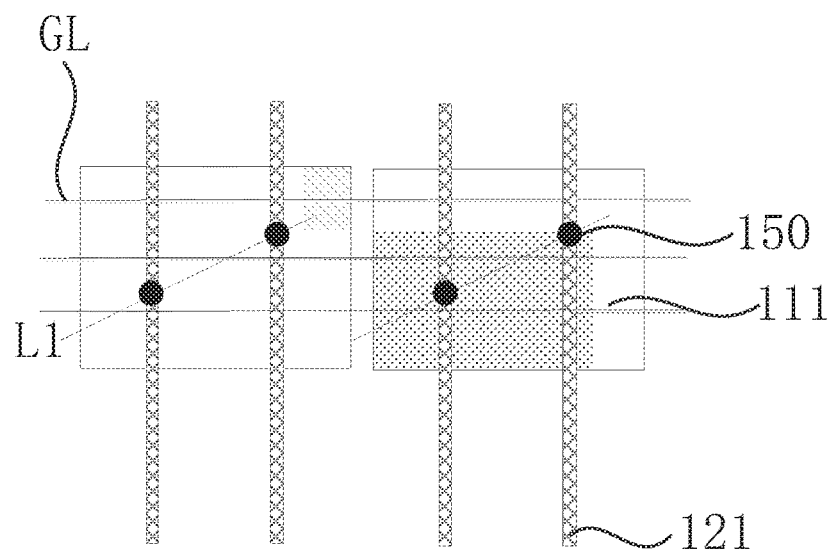
FIG. 3 illustrates a partial schematic diagram of still another touch display panel according to an embodiment of the present disclosure.

FIG. 3 illustrates a partial schematic diagram of still another touch display panel according to an embodiment of the present disclosure, on the basis of the above embodiments, one touch electrode 111 can be electrically connected with at least two touch signal lines 121. More touch signal lines 121 can improve stability of the touch signal line connection, the touch signal line 121 includes a through hole 150, so as to achieve electrical connection between the touch signal line and the touch electrode. Optionally, in at least two touch signal lines 121, a connection line L1 connecting the through hole 150 corresponding to one touch signal line 121 with any through hole 150 of any adjacent touch signal line 121 is not parallel to the extending direction of the gate line GL.

Based on the embodiments of FIGS. 1a-2, it is further found that, since the gate line of the display panel is arranged in rows, the gate electrode drive signal is provided to the pixel unit row-by-row, and the data signal is successively provided, human eyes are more sensitive to brightness changes in row direction of the gate line. When at least two through holes are arranged on one touch electrode, if the connection line connecting adjacent through holes is parallel to the extending direction of the gate line, perceptual sensitivity of human eyes to the through hole will be increased while displaying, so that the connection line L1 connecting the through hole 150 corresponding to one touch signal line 121 with any through hole 150 of any adjacent touch signal line 121 is provided to be not parallel to the extending direction of the gate line GL, thereby further reducing visibility of the through hole.

It should be understood that, by providing the connection line connecting through holes of adjacent touch signal lines to be not parallel to the gate line, brightness difference in the extending direction of the gate line can be further reduced. As for through holes of non-adjacent touch signal lines, since the distance is relatively far, linear distribution perception is difficult to be formed, which brings less influence on display.

Figure 4:
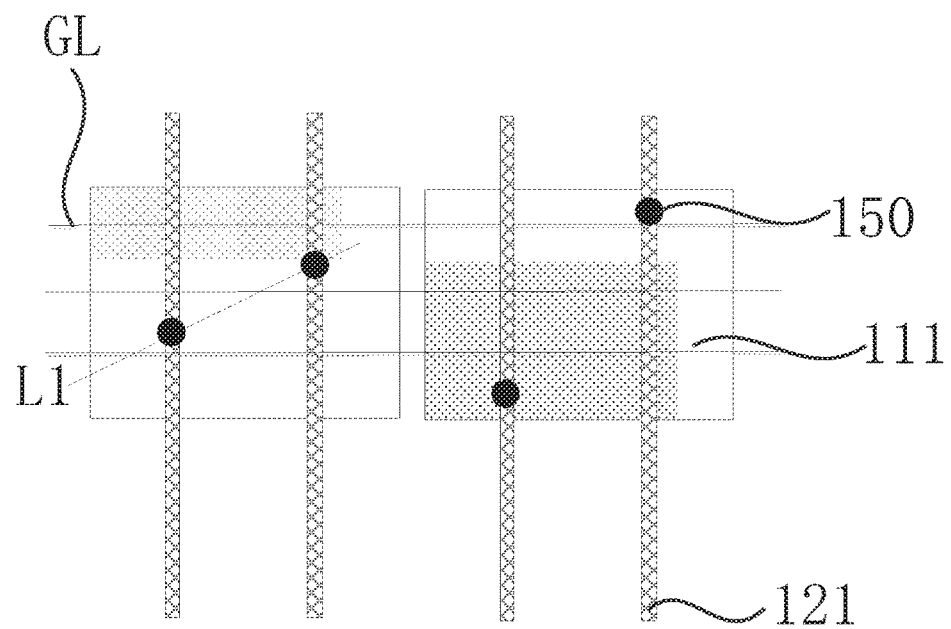
FIG. 4 illustrates a partial schematic diagram of still another touch display panel according to an embodiment of the present disclosure.

Optionally, FIG. 4 illustrates a partial schematic diagram of still another touch display panel according to an embodiment of the present disclosure, it is further possible that the connection line connecting the through hole corresponding to one touch signal line with any through hole of any touch signal line is provided to be not parallel to the extending direction of the gate line, so that the connection line connecting any through holes is not parallel to the gate line, thereby further reducing the display mura.

It should be noted that, the solution provided by the embodiments of the present disclosure includes less through holes with respect to the prior art because it is not necessary to provide the dummy touch signal line and the dummy through hole, so that distribution and adjustment of through hole can be made in a more flexible and free manner.

In the embodiments of the present disclosure, based on relation between the number of through hole covered by one touch electrode and the number of pixel unit covered by one touch electrode, it is possible to easily achieve that the distribution of the through hole in the gate line direction does not for a straight line, thereby greatly reducing the display mura. However, in the manner of providing the dummy through hole in the prior art, the number of through hole is large, which makes it difficult to make adjacent through holes in a specific direction not form a straight line, and it is more difficult to make any connection line connecting any through holes not be parallel to the gate line.

Optionally, it is possible that two touch signal lines 121 are connected with one touch electrode 111, at this time, on one hand, it can make the electrical connection between the touch electrode and the touch signal line more stable and, on the other hand, the number of through hole can be at least two, according to the technical solutions provided by the embodiments of the present disclosure, it is required that the number of pixel unit covered by one touch electrode is not less than 20, the size requirement on the touch electrode is reduced, so as to be more flexibly adaptive to figure and size designs of touch electrode corresponding to different touch sensitivities.

Figure 5:
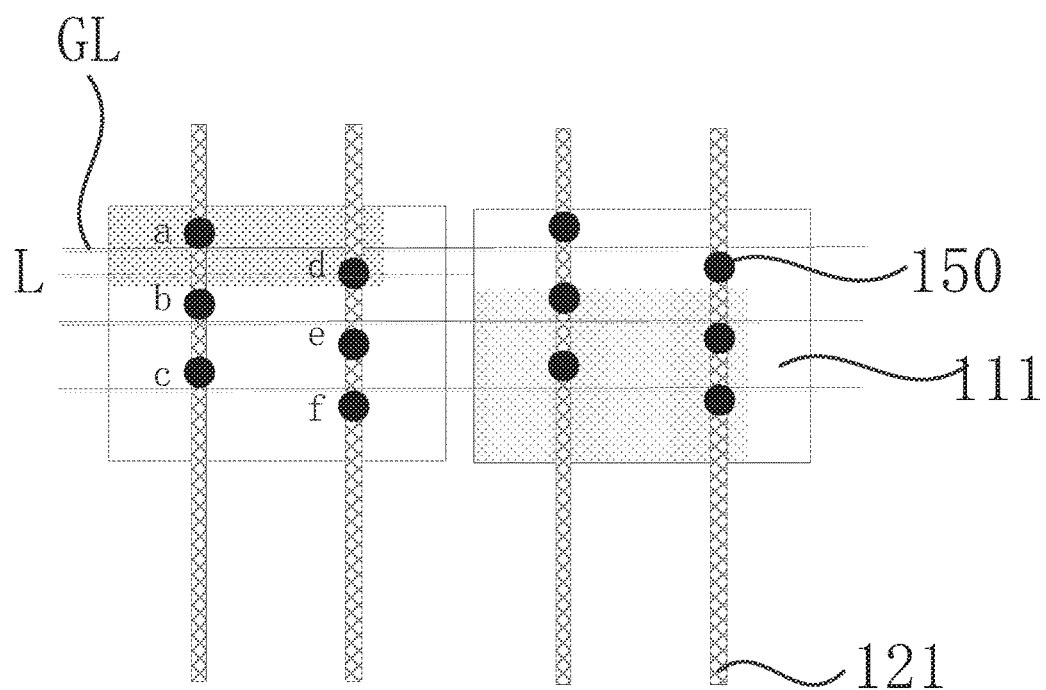
FIG. 5 illustrates a partial schematic diagram of still another touch display panel according to an embodiment of the present disclosure.

Optionally, FIG. 5 illustrates a partial schematic diagram of still another touch display panel according to an embodiment of the present disclosure, the difference of the embodiment shown in FIG. 5 lies in that, one touch signal line 121 is electrically connected with the touch electrode 111 via multiple through holes. As a result, increase of the number of through hole can improve connection stability between the touch electrode 111 and the touch signal line 121, thereby reducing risk of failure of the touch signal line caused by instable connection of the touch signal line. When the number of through holes electrically connected with one touch signal line is more than one, as for different touch signal lines electrically connected with a same touch electrode, the connection line between through holes of two adjacent touch signal lines is not parallel to the extending direction of the gate line. Moreover, as for through holes on two adjacent touch signal lines, the through holes are staggeredly distributed in the gate line direction, the "staggeredly distributed" means, for example, through hole b is located between through hole d and through hole e in the gate line direction, and through hole c is located between through hole e and through hole f in the gate line direction. Such a distribution manner can make distribution density of the through holes to be uniform, thereby avoiding a partial overlarge distribution density of the through holes, resulting in that the through hole is visible.

Optionally, a straight line passing one through hole is made in a direction parallel to the gate line, which is the midperpendicular of a connection line connecting two adjacent through holes of a same touch signal line. With reference with FIG. 5, a straight line L passing the through hole d is made, which is the midperpendicular of a connection line ab between two adjacent through holes a and b. It should be understood that, based on that the connection line connecting two adjacent through holes is not parallel to the gate line, such an arrangement can make distribution of the through hole to be maximally uniform, thereby avoiding display mura phenomenon caused by non-uniform distribution density of the through holes.

In the technical solutions in the embodiments of the present disclosure, by merely adjusting relation between the number of through hole and the number of pixel unit on one touch electrode, the requirement of the display panel on invisibility of the through hole can be met, and thus limitation to the structure spatial distribution of each part of the touch display panel is greatly reduced.

What is claimed is:

1. A touch display panel, comprising:
a first substrate;
a plurality of pixel units provided on the first substrate and arranged in an array;
a touch electrode layer provided on the first substrate, the touch electrode layer comprising a plurality of touch electrodes, the plurality of touch electrodes arranged in an array and insulated from each other;
a touch signal line layer comprising a plurality of touch signal lines;
a control circuit configured to provide a touch signal to the plurality of touch electrodes, wherein each of the plurality of touch signal lines electrically connects one of the plurality of touch electrodes with the control circuit, and each of the plurality of touch electrodes is electrically connected with at least one of the plurality of touch signal lines; and
an insulation layer provided between the touch electrode layer and the touch signal line layer, the insulation layer comprising a plurality of through holes, the plurality of touch electrodes electrically connected with the plurality of touch signal lines via the plurality of through holes;
wherein a distribution density of the plurality of through holes is less than or equal to 0.1, and the distribution density of the plurality of through holes is defined as: a ratio of the number of the plurality of through holes covered by one touch electrode of the plurality of touch electrodes to the number of the plurality of pixel units covered by the one touch electrode of the plurality of touch electrodes.

2. The touch display panel according to claim 1, further comprising:
a plurality of data lines; and
a plurality of gate lines,
wherein the plurality of gate lines intersects with the plurality of data lines so as to define a pixel area, and the plurality of pixel units are located in the pixel area;
the plurality of touch signal lines and the plurality of data lines are arranged in a same layer.

3. The touch display panel according to claim 2, wherein, an extending direction of the plurality of touch signal line is identical to an extending direction of the plurality of data lines, and the plurality of touch signal lines is located within an interval area among the plurality of pixel units.

4. The touch display panel according to claim 3, wherein, two adjacent columns of the plurality of pixel units are provided with one of the plurality of touch signal lines.

5. The touch display panel according to claim 1, wherein, the plurality of touch electrodes are formed as a block shape, an orthogonal projection of one of the plurality of touch signal lines on the touch electrode layer is overlapped with multiple of the plurality of touch electrodes.

6. The touch display panel according to claim 2, wherein, one of the plurality of touch electrodes is electrically connected with at least two of the plurality of touch signal lines, for the at least two touch signal lines, a connection line connecting a through hole corresponding to one touch signal line with any through hole corresponding to any adjacent touch signal line is not parallel to an extending direction of the gate line.

7. The touch display panel according to claim 6, wherein, a connection line connecting a through hole corresponding to one touch signal line with any through hole corresponding to any touch signal line is not parallel to the extending direction of the gate line.

8. The touch display panel according to claim 6, wherein, the number of the plurality of touch signal lines electrically with one of the plurality of touch electrodes is two.

9. The touch display panel according to claim 6, wherein, one of the plurality of touch signal lines is electrically connected with the touch electrode via multiple of the plurality of through holes.

10. The touch display panel according to claim 1, wherein, the plurality of touch electrodes are used as a common electrode during a display stage, and the common electrode provides a common signal to the plurality of pixel units.

* * * * *